US012569888B2

(12) United States Patent
Yang et al.

(10) Patent No.: US 12,569,888 B2
(45) Date of Patent: Mar. 10, 2026

(54) CLEANING DEVICE FOR NET MONITOR AND SLICER

(71) Applicant: TCL ZHONGHUAN RENEWABLE ENERGY TECHNOLOGY CO., LTD., Tianjin (CN)

(72) Inventors: Xuzhou Yang, Tianjin (CN); Haoming Zhang, Tianjin (CN); Rui Wu, Tianjin (CN); Chen Wei, Tianjin (CN); Pengzhan Zhao, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 311 days.

(21) Appl. No.: 18/548,587

(22) PCT Filed: Jul. 31, 2023

(86) PCT No.: PCT/CN2023/110407

§ 371 (c)(1),
(2) Date: Sep. 1, 2023

(87) PCT Pub. No.: WO2024/045997

PCT Pub. Date: Mar. 7, 2024

(65) Prior Publication Data

US 2025/0018437 A1 Jan. 16, 2025

(30) Foreign Application Priority Data

Aug. 31, 2022 (CN) ......................... 202211061912.0

(51) Int. Cl.
*B08B 3/02* (2006.01)
*B28D 5/00* (2006.01)
*B05B 1/14* (2006.01)

(52) U.S. Cl.
CPC ............ *B08B 3/024* (2013.01); *B28D 5/0076* (2013.01); *B05B 1/14* (2013.01); *B28D 5/0058* (2013.01)

(58) Field of Classification Search
CPC .... B28D 5/0076; B28D 5/0058; B08B 3/024; B05B 1/14
See application file for complete search history.

(56) References Cited

U.S. PATENT DOCUMENTS

2008/0213978 A1* 9/2008 Henry .................... B23K 26/40
257/E21.238
2014/0060592 A1* 3/2014 Pan ......................... B08B 3/024
134/172

(Continued)

FOREIGN PATENT DOCUMENTS

CN 1772393 A 5/2006
CN 103658077 A 3/2014

(Continued)

OTHER PUBLICATIONS

International Search Report in International application No. PCT/CN2023/110407,mailed on Nov. 2, 2023.

(Continued)

*Primary Examiner* — Benjamin L Osterhout
(74) *Attorney, Agent, or Firm* — PV IP PC; Wei Te Chung

(57) ABSTRACT

Embodiments of the present disclosure are directed to a cleaning device for a net monitor and a slicer equipped with the cleaning device. The cleaning device includes a cleaning member. The cleaning member is constructed with a cavity and a plurality of the tunnels provided at one end of the cavity. The tunnels diverge from one end of the cavity to one (Continued)

side of the outer end face of the cleaning member. Angles between axes of the tunnels and an axis of the cavity are different from each other.

20 Claims, 6 Drawing Sheets

(56) References Cited

U.S. PATENT DOCUMENTS

| | | | | |
|---|---|---|---|---|
| 2017/0225186 | A1 | 8/2017 | Ferguson et al. | |
| 2019/0076981 | A1* | 3/2019 | Sekiya | B24B 27/0683 |

FOREIGN PATENT DOCUMENTS

| | | | | | |
|---|---|---|---|---|---|
| CN | 208810651 | U | | 5/2019 | |
| CN | 215282704 | U | | 12/2021 | |
| CN | 114851415 | A | | 8/2022 | |
| CN | 218286219 | U | | 1/2023 | |
| KR | 20160119694 | A | * | 10/2016 | H01L 21/67288 |
| KR | 20180113165 | A | * | 10/2018 | B28D 5/022 |
| KR | 20190016914 | A | * | 2/2019 | H01L 22/20 |
| WO | WO-2009128786 | A2 | * | 10/2009 | B28D 5/0082 |

OTHER PUBLICATIONS

Written Opinion of the International Search Authority in International application No. PCT/CN2023/110407,mailed on Nov. 2, 2023.

* cited by examiner

CLEANING DEVICE FOR NET MONITOR AND SLICER

CROSS-REFERENCE TO RELATED APPLICATION

The present disclosure claims priority to and the benefit of Chinese Patent Application No. 202211061912.0 filed on Aug. 31, 2022, the disclosure of which is incorporated herein by reference in its entirety.

FIELD OF THE DISCLOSURE

The present disclosure relates to a technical field of ancillary devices for slicers, and more particularly, to a cleaning device for a net monitor and a slicer provided with such cleaning device.

BACKGROUND

In the manufacturing step of cutting wafers, a net monitor is highly susceptible to the mixing of water mist caused by cutting fluid in the cutting chamber and silica waste (mud) brought out by cutting silicon wafers. As a result, the net monitor, such as sensors or cameras, cannot recognize the status or has an error, which in turn affects the accuracy of the net status judgment. Therefore, it is important for this industry to provide a cleaning device that can quickly clean the cutting fluid and silica waste on the net monitor in a limited space of the cutting room, without affecting the working effect of the net monitor.

SUMMARY

One objective of an embodiment of the present disclosure is to provide a cleaning device for a net monitor and a slicer equipped with the cleaning device, which can quickly and effectively clean the silica waste and cutting fluid on the outer protective housing of the net monitor emitter.

According to an embodiment of the present disclosure, a cleaning device for a net monitor is disclosed. The cleaning device includes a cleaning member. The cleaning member is constructed with a cavity and a plurality of the tunnels provided at one end of the cavity. The tunnels diverge from one end of the cavity to one side of the outer end face of the cleaning member. Angles between axes of the tunnels and an axis of the cavity are different from each other.

In some embodiment of the present disclosure, one angle between an axis of one of the tunnels and the axis of the cavity is at an acute angle less than 30°.

In some embodiment of the present disclosure, the cavity is further connected with two through pipes respectively so that fluids in the two through tubes are mixed in the cavity.

In some embodiment of the present disclosure, the cavity is constructed as a ring columnar structure and the outer end face of the cavity near one side of the tunnels is an arc surface structure.

In some embodiment of the present disclosure, in the outer end face of the cleaning member near one side of the tunnels, a circumferential edge of the outer end face, along where the orifice is located, is constructed with a groove, and the structure of the groove matches the structure of the outer end face of the cleaning member. An end face of the groove located below the tunnels is constructed as an open structure. An outer end face where the tunnels are located is a flat surface and is disposed flush with the outer end face of the cleaning member.

In some embodiment of the present disclosure, the cleaning member is provided with a baffle at a top of the end face near one side of the tunnels.

In some embodiment of the present disclosure, the cleaning device further includes a rotating axis placed in a thickness direction of the cleaning member, configured to fix the cleaning member to the mount. Orientations of the tunnels are adjusted by rotating the cleaning member using the rotating axis as a center.

In some embodiment of the present disclosure, the cleaning device further includes a riser. The mount and the riser are disposed on a same side of the cleaning member. The mount, the riser and the cleaning member are connected to each other. A wide outer end face of the riser is convex at the end face of the cleaning member close to the tunnels.

In some embodiment of the present disclosure, the cleaning device further includes a guide frame, placed on top of the cleaning member and connected to the mount. The mount includes a guiding tunnel, placed close to one side of the cavity.

In some embodiment of the present disclosure, the cleaning device further includes a deflector plate, placed on one side near the tunnels, connected to the riser.

According to an embodiment of the present disclosure, a slicer is disclosed. The slicer includes the above-mentioned cleaning device.

1. The present disclosure discloses a cleaning device and a related slicer have a gas-liquid mixing and adjustable flow, can directly aim at the net monitor to clean, which not only have a fast cleaning speed but also a good cleaning effect. It is possible to clean the silica waste or the water mist on the housing surface corresponding to the monitor emitter in a very short time.
2. The tunnels are distributed in a radial pattern from one end of the cavity to the outer end surface of the cleaning piece, which makes it easier to obtain a fluid solution with different injection flow rates at multiple angles to clean the silica waste or water mist on the housing surface of the monitor. This could quickly and accurately clean the silica waste or water mist in the housing surface corresponding to the monitor emitter in a very short time and improve the cleaning efficiency and cleaning quality.
3. By controlling the rotation of the cleaning member using the axis of the rotation axis as a center, the rotation direction of the cleaning member can be adjusted, so that the position of the end face of the tunnels relative to the housing surface of the monitor can be adjusted. This allows the end face of the tunnels to be set parallel to the housing surface of the monitor, so that the fluid in the tunnels can be directly sprayed toward to the housing surface of the monitor to improve cleaning effectiveness and avoid waste of cleaning fluid.
4. The axis of the water injecting tunnel that intersects with the axis of the cavity is inclined in the direction close to the side of the tunnel, in order to increase the pressure of the water, so that it could quickly move forward in the direction of the flow rate in the cavity, and can be mixed and moved by the air flow in the direction of the tunnel at the same time. The structure of inclined setting can also further reduce the occupied area and the installation space of the through-tunnel, avoid its interference with other devices, and improve the space utilization rate in the cutting chamber.
5. There is a groove between the outer end surface of the tunnels and the outer wall of the cleaning member as the circulation channel of the washed silica waste, and the water mist or cleaning liquids reflected to the end of the cleaning member flows down through the open groove into the deflector plate to avoid secondary pollution to the housing surface of the monitor.

6. The present disclosure also provides a cleaning method for sampling the cleaning device. The cleaning quality is controllable and safe, the cleaning effect is good and the speed is fast.

LIST OF REFERENCE SIGNS

| | | |
|---|---|---|
| 100: Cleaning device; | 200: Monitor; | |
| 10: Cleaning member; | 20: Mount; | 30: Riser; |
| 40: Guide; | 50: Protective plate; | 60: Deflector plate; |
| 11: Cavity; | 12: Tunnels; | 13: Air inlet tunnel; |
| 14: Water inlet tunnel; | 15: Groove; | 16: Step tunnel; |
| 17: Baffle; | 18: First epitaxial plate; | 19: Second epitaxial plate; |
| 31: Rotary axis; | 41: Groove of the guide frame; | 42: Guiding tunnel. |

DETAILED DESCRIPTION OF EMBODIMENTS

Specifically, the terminologies in the embodiments of the present disclosure are merely for describing the purpose of the certain embodiment, but not to limit the disclosure. Examples and the appended claims be implemented in the present disclosure requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
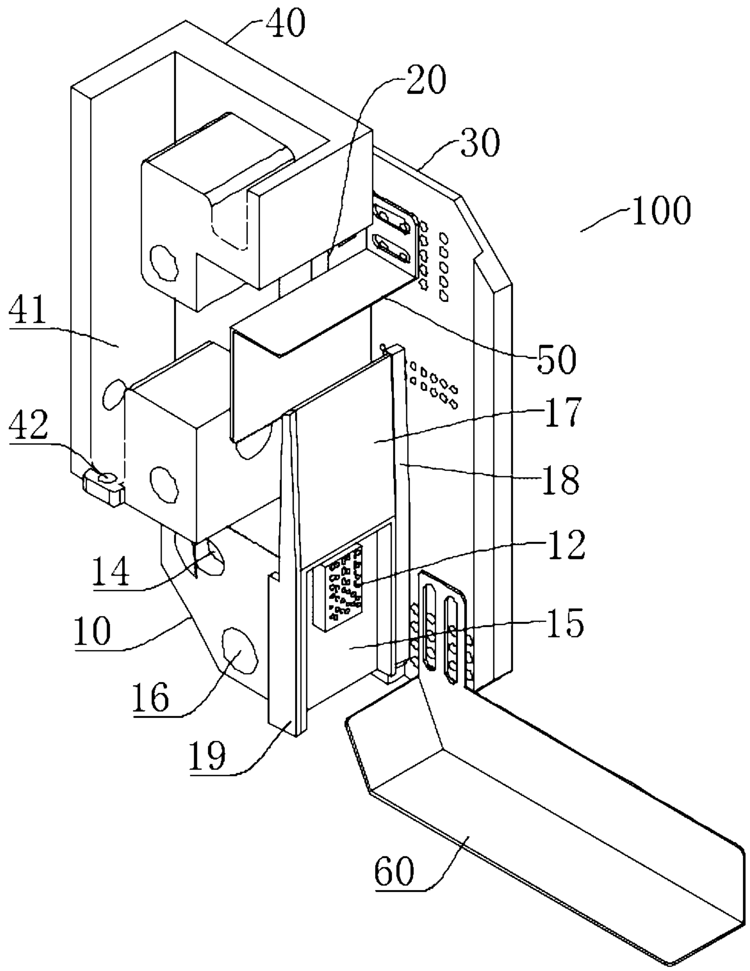
FIG. 1 is a diagram of a cleaning device for a net monitor according to an embodiment of the present disclosure.
Figure 2:
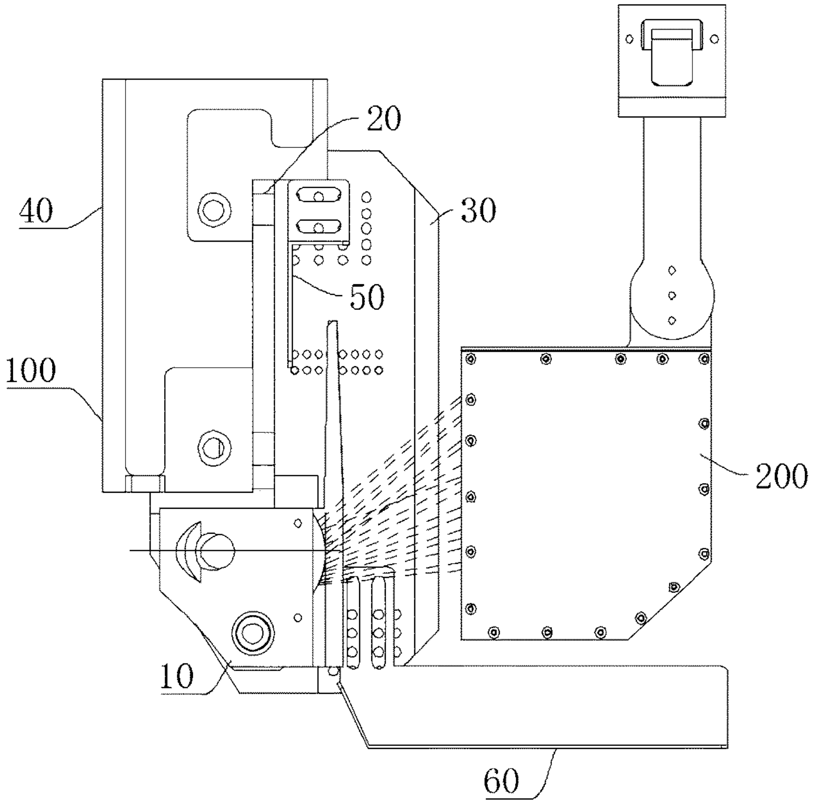
FIG. 2 is a diagram of a cleaning device in coordination with a net monitor according to an embodiment of the present disclosure.

Please refer to FIG. 1. As shown in FIG. 1, in this embodiment, a cleaning device 100 for a net monitor is disclosed. The cleaning device is mainly used for cleaning the housing surface of the net monitor 200. The cleaning positions of the monitor 200 and the cleaning device are shown in FIG. 2. During cleaning, the cleaning device 100 is located directly opposite the monitor 200. The cleaning device 100 includes a cleaning member 10. The cleaning member 10 is constructed with a cavity 11. A plurality of the tunnels 12 are provided at one end of the cavity 11 and connected to the cavity 11. The tunnels 12 diverge from one end of the cavity 11 to one side of the outer end face of the cleaning member. The tunnels 12 diverge from one end of the cavity 11 towards the outer end face of the cleaning member 10 in a divergent distribution. That is, the axes of the tunnels 12 and the axis of the cavity is separated and/or intersected and/or parallel. In this way, the fluid mixed in the cavity 11 could be sprayed toward through different inclined and/or horizontal tunnels 12 towards the housing surface of the monitor 200 to obtain a fluid solution with different injection flow at multiple angles to clean the silica wastes (muds) or water mists on the housing surface of the monitor 200 such that the silica wastes or water mists on the housing surface corresponding to the emitter of the monitor 200 (hereinafter referred to as the housing surface of the monitor 200) could be the quickly and accurately cleaned In a very short time. This improves the cleaning efficiency and cleaning quality.

Figure 3:
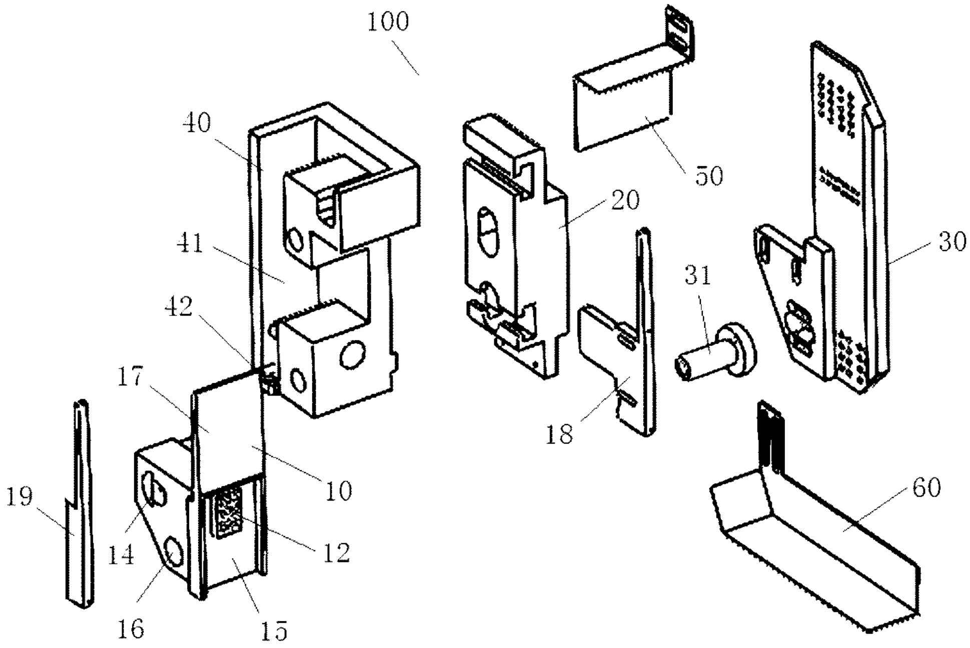
FIG. 3 is an explosion view of a cleaning device according to an embodiment of the present disclosure.
Figure 4:
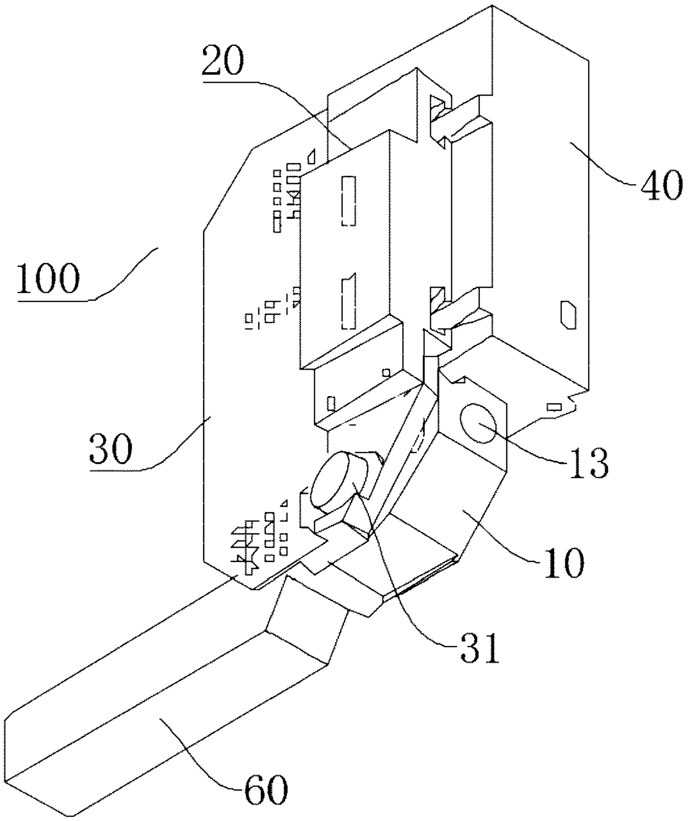
FIG. 4 is a rear view of a cleaning device according to an embodiment of the present disclosure.

As shown in FIG. 3 and FIG. 4, the cleaning device 100 further includes a mount 20 for fixing the cleaning member 10, a riser 30 for adjusting the direction of the cleaning end of the cleaning member 10, and a guide 40 for binding the air tube and the water pipe. Here, the mount 20 and the riser 30 are constructed on the same side of the cleaning member 10, and the mount 20, the riser 30 and the cleaning member 10 are connected to each other. The guide 40 and the mount 20 snap fit and are located directly above the cleaning member 10. Its structure will be described in details later.

Figure 5:
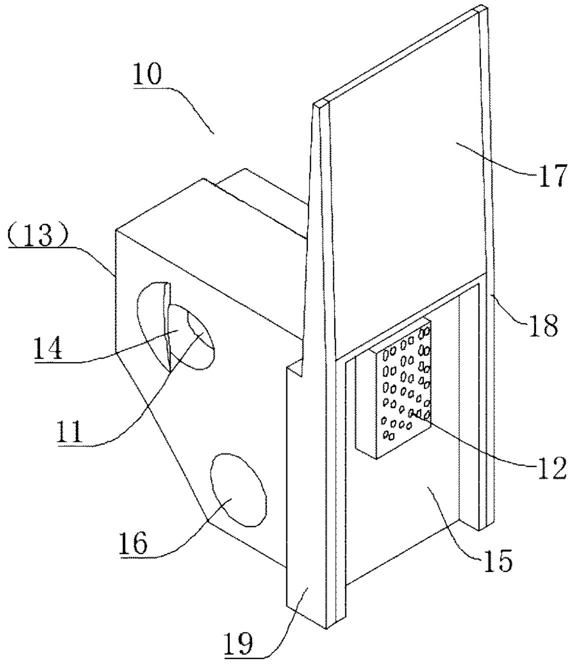
FIG. 5 is a diagram of a cleaning member according to an embodiment of the present disclosure.
Figure 6:
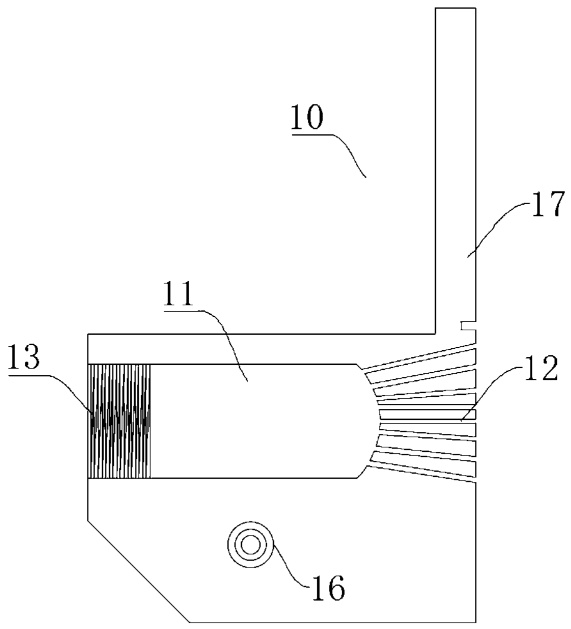
FIG. 6 is a cross-section view of a tunnel in the cleaning member according to an embodiment of the present disclosure.
Figure 7:
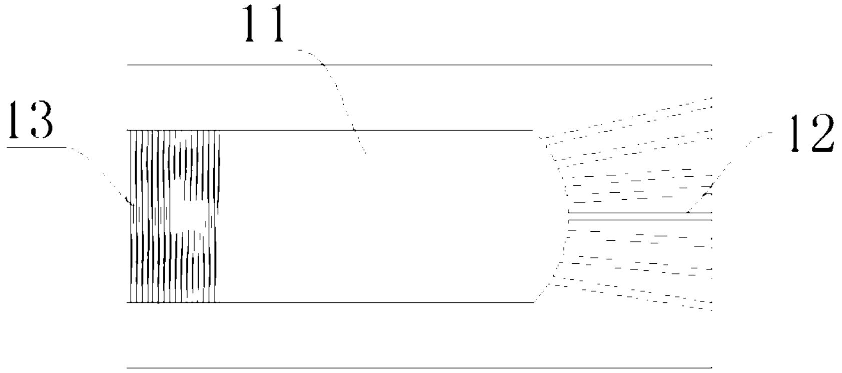
FIG. 7 is a cross-section view of a tunnel in the cleaning member according to another embodiment of the present disclosure.

The angles between axes of the tunnels 12 and an axis of the cavity 11 are different from each other. Preferably, in this embodiment, the angles between the axes of the tunnels 12 in the same column/row and the axis of the cavity 11 are different from each other, as shown in FIGS. 5-7. The purpose is to improve the anisotropy of the directions of the output ends of the tunnels 12, so as to improve the cleaning difference and coverage area of the housing surface of the monitor 200. This increases the cleaning intensity of the housing surface and ensures the cleaning effect.

As shown in FIG. 5, it can be seen that the orientation angles of all the tunnels 12 in the same column are different from each other and all intersect with the axis of the cavity 11. The direction of the tunnels 12 is vertical and oblique for increasing the cleaning area of the cleaning fluid on the basis of ensuring the cleaning effect. The orientation of different angles can further improve the difference in its flow rate to improve the spraying quality. This structure is adapted to the position of the monitor 200 to be cleaned relative to the position of the cleaning member 10 is set obliquely, so that all the tunnels 12 are arranged obliquely in different angles of the flow direction. Different columns of tunnels 12 can also be separated from the axis of the cavity 11, or can be set to spray the fluids in set different oblique angles. This can achieve different spraying cleaning effect.

As shown in FIG. 6, the tunnels 12 of the same column are partially vertically obliquely downward, partially horizontally set, and partially obliquely upward. And the angles of oblique down and oblique up are different. Preferably, the orientation angles of the tunnels 12 near the axis center of the cavity 11 and both sides thereof are smaller than the angles of the tunnels 12 away from the axis center of the cavity 11. Because the cavity 11 is close to the bottom of the arc surface at one end of the tunnel 12, the pressure of the fluid at its intermediate axis position is the largest. Then, the inclination angles of the tunnels 12 located in the axis center of the cavity 11 and its two sides are small and the flowing lengths of the tunnels 12 are shorter. This can increase its spraying flow and the cleaning speed of the fluid. In the process of net monitoring, the housing surface of the monitor 200 near the lower end of the net is in contact with silica waste on the housing. That is, in the middle position of the housing surface of the monitor 200 and its lower part, silica wastes accumulate. Therefore, for the tunnels 12 corresponding to the upper and lower sides of the axis of the cavity 11, the fluid around the middle position has a greater spraying velocity, which can efficiently and quickly clean the silica waste covering the middle part of the housing surface of the monitor 200. As for the tunnels 12 in the upper and lower sides of the axis of the cavity 11, the fluids in those tunnels could be used as an auxiliary to clean the housing surface of the monitor 200 as long as it can fully cover the height of the housing surface of the monitor 200.

As shown in FIG. 7, the tunnels 12 of the same row are partially vertically obliquely downward, partially horizontally set, and partially obliquely upward, which are different from each other. Nevertheless, these tunnels 12 can achieve the function of cleaning silica wastes and water mists. These changes all fall within the scope of the present disclosure.

All tunnels 12 have an inclination angle less than 90°. Preferably, the inclination angles of all tunnels 12 are not more than 30°. The purpose is to minimize the length of the tunnels 12 to increase the speed of its ejection.

Figure 8:
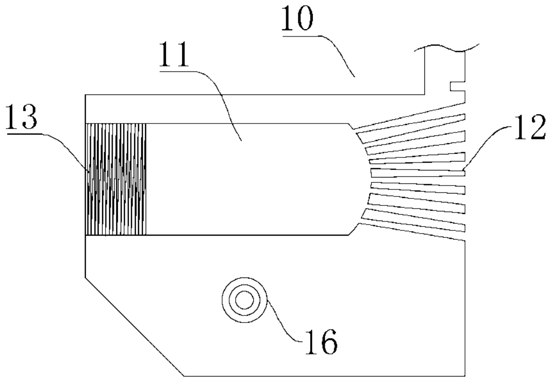
FIG. 8 is a diagram of a variable diameter tunnel according to an embodiment of the present disclosure.

In order to improve the spraying effect of the fluid in the tunnels 12, the diameter of the tunnels 12 can be an equal diameter structure. That is, it has always been the same diameter through the w tunnel flow channel (not shown). Or, it can be a variable diameter structure as shown in FIG. 8. The tunnel 12 has a narrow front and a large rear diameter structure. After the cavity 11 is connected to the air tube and the liquid pipe to be sealed to form a vacuum cavity, because the high-pressure air flow and high-pressure water flow enter the cavity 11 through the air inlet tunnel 13 and the water inlet tunnel 14 to mix, the mixed fluid enters each tunnel 12 along the arc surface of the cavity 11. The tunnel 12 has a narrower body near the cavity 11 so that the speed of the mixed gas-liquid fluid slows down but the pressure increases. The fluid forms a strong jet flow and then sprays outward through the expansion section, forming a high-strength jet fluid to clean the housing surface of the monitor 200. This can further improve the cleaning effect without modifying the original configuration structure.

Figure 9:
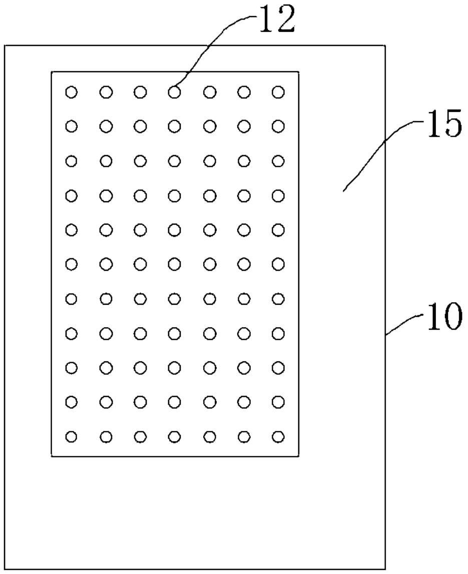
FIG. 9 is a diagram of the end faces of tunnels in a side-by-side distribution according to an embodiment of the present disclosure.
Figure 10:
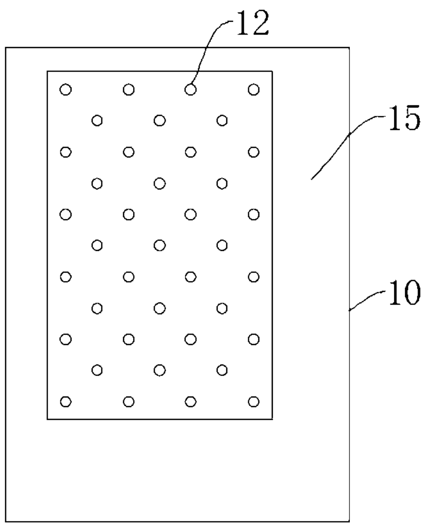
FIG. 10 is a diagram of the end faces of tunnels in a staggered distribution according to another embodiment of the present disclosure.
Figure 11:
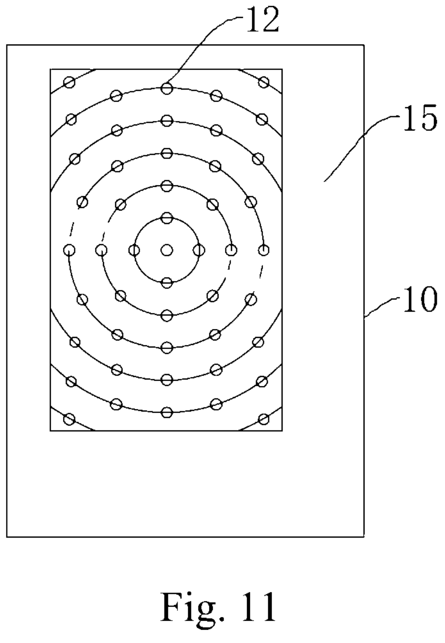
FIG. 11 is a diagram of the end faces of tunnels in a concentric circle distribution according to another embodiment of the present disclosure.

The tunnels 12 are arranged on the end face of the cleaning member 10 in a side-by-side, staggered or concentric circle distributions. Specifically, the tunnels 12 may be arranged in a side-by-side distribution on the end face of the cleaning member 10 as shown in FIG. 9; or arranged in a staggered distribution as shown in FIG. 10; or arranged in a concentric circle distribution as shown in FIG. 11. Regardless of the distribution configuration of the tunnels 12 on the end face, it is necessary to ensure that the tunnels 12 have all the above technical characteristics.

The cavity 11 further includes an air inlet tunnel 13 and a water inlet tunnel 14. The air inlet tunnel 13 and the water inlet tunnel 14 are respectively connected with a gas pipe and a liquid pipe to receive gases and water (not shown) to mix the fluids in the two pipes in the cavity 11. The air inlet tunnel 13 in the cavity 11 is located at its tail, which is at the end face corresponding to the tunnel 12, so that it's more convenient for installation. Or, it can also be set on the side wall surface in the cavity 11. Or, it can be set according to the actual situation. All these changes fall within the scope of the present disclosure.

At least one of the axes of the through pipe intersects the axis of the cavity 11. That is, the gas tube is connected to the water inlet tunnel 14 provided on the side wall of the cavity 11, and the axis of the water inlet tunnel 14 intersects the axis of the cavity 11. Preferably, the axis of the water inlet tunnel 14 intersecting with the axis of the cavity 11 is inclined in the direction close to the side of the tunnels 12. That is, the axis of the inlet tunnel 14 is inclined in the direction of the fluid flow velocity, and the inclination angle is 45°. The purpose is to increase the pressure of the water, so that it quickly moves forward in the direction of the flow velocity in the cavity 11, and may also be forced by the air flow to move toward the direction of the tunnels 12. The structure of inclined setting can reduce the occupied area of the tubes, their installation spaces, avoid their interference with other devices, and improve the space utilization rate in the slicing room.

The cavity 11 is structured as a ring columnar structure, which facilitates the mixing of gas and liquid in its inner cavity. And the end face of the side of the cavity 11 near the tunnel 12 is an arc structure, which is more conducive to the flow of fluid. Preferably, the cross-section of the cavity 11 close to the tunnel 12 is larger than the cross-section of the cavity 11 away from the tunnel 12. In other words, the cross-section of the cavity 11 between the air inlet tunnel 13 and water the inlet tunnel 14 is smaller than the area of the cross-section between the inlet tunnel 14 and the tunnel 12 (not shown). The purpose is to improve the mixing of gas and liquid therein to increase the cleaning effect.

As shown in FIG. 5, in the outer end face of the cleaning member 10 near the side of the tunnel 12, there is a groove 15 along the perimeter of the outer end face where the tunnel 12 is located. The structure of the groove 15 is compatible with the structure of the outer end face of the cleaning member 10, and the end face of the groove 15 located below the tunnel 11 is an open structure. That is, the groove 15 is placed between the outer end face of the tunnel 12 and the outer wall surface of the cleaning member 10 as a circulation channel for the silica wastes to be washed. In addition, at the same time, the water mist or cleaning liquid reflected to the end of the cleaning member 10 flows down through the open groove 15 into the deflector plate 60. This avoids the secondary contamination of the surface of the housing surface of the monitor 200.

The outer end face of the tunnel 12 is a flat surface, and the outer end face of the side of the cleaning member 10 close to the tunnel 12 is set flush, in order to improve the stability when the housing surface of the cleaning member 10 and the monitor 200 contact each other.

At the top of the end face of the cleaning member 10 near the tunnel 12, there is also a baffle 17 extending in the direction away from the groove 15. That is, at the top of the end face of the cleaning member 10 near the tunnel 12 is provided with a vertically upward baffle 17. The purpose of the baffle 17 is to block the splash of silica wastes, water mists or fluids.

On both sides of the cleaning member 10, there are epitaxial plates extending towards the side away from the tunnels 12 and matching the structure of the sidewalls. That is, a first epitaxial plate 18 and a second epitaxial plate 19, which extend outward, are placed on both sides of the cleaning member 10. The first epitaxial plate 18 is located on the side of the cleaning member 10 body close to the riser 30, where its width and height match the side of the cleaning member 10 near the riser 30, and the thickness of the rotary axis 31 through the first epitaxial plate 18 is connected with the step tunnel 16. The second epitaxial plate 19 is located on the side of the cleaning member 10 body near the water inlet tunnel 14, and its width is narrower and not exceeding the stepped tunnel 16. The second epitaxial plate 19 is only used as an outward extending baffle and connected to the cleaning member 10. Preferably, the first epitaxial plate 18 and the body of the cleaning member 10 are separately manufactured, and the second epitaxial plate 19 and the body of the cleaning member 10 are integrally manufactured. However, the first epitaxial plate 18 and the body of the cleaning member 10 could be integrally manufactured, and the second epitaxial plate 19 and the body of the cleaning member 10 separately manufactured. Here, the first epitaxial plate 18 and the second epitaxial plate 19 are combined with the body of the cleaning member 10 to form a structure with an extended epitaxial thickness, which can prevent the fluid from diffusing outward, so that the fluid is sealed and only allowed to flow in the first epitaxial plate 18, the body of the cleaning member 10, the second epitaxial plate 19, the groove 15, the baffle 17 and the cleaning monitor 200. The purpose is to increase the splashing width and the area of the cleaning member 10, which blocks the silicon wastes, water mists or fluids splash width area. This can further improve the efficiency of fluid injection towards the monitor. Preferably, each of the thicknesses of the first epitaxial plate 18 and the second epitaxial plate 19 does not exceed 50 mm, and the first epitaxial plate 18 and the lower end face of the second epitaxial plate 19 are compatible with the lower end face of the body of the cleaning member. 10. The heights of the first epitaxial plate 18 and the second epitaxial plate 19 are compatible with the height of the baffle 17.

Preferably, in the thickness direction of the cleaning member 10, a step tunnel 16 is provided for fixing the cleaning member 10 in the mount 20. The step tunnel 16 is located below the cavity 11. Through the rotary axis 31, the cleaning member 10 is connected to the riser 30. By rotating the cleaning member 10 centered on the axis of the step tunnel 16, the orientation position of the tunnel 12 is adjusted. The purpose is to make the end face of the tunnel 12 facing the housing surface of the monitor 200. That is, the end face of the tunnel 12 is set parallel to the housing surface of the monitor 200, so that the fluid in the tunnel 12 can directly be sprayed on the housing surface of the monitor 200 and thus the cleaning quality is improved.

Specifically, as shown in FIGS. 3-4, the lower end face of the mount 20 is directly connected to the cleaning member 10, and its outer wall surface is fixed on the external shelf (not shown). For example, it can be fixed on the inner wall of the slicing chamber or a special fixed rod, which may be determined based on working conditions. These changes all fall within the scope of the present disclosure. The back of it may have two long strip-shaped tunnels for adjusting the upper and lower positions of the cleaning device 100. Or, a long horizontal tunnel can also be set on the back of it, depending on the actual situation. On one side of the mount 20 near the cleaning member 10, a card slot disposed in the direction of its width is disposed. The card slot is placed at both ends thereof and is adapted to the clip on the back of the guide frame 40. The purpose is to adjust the position of the guide frame 40, so that the gas tube and the liquid tube could be guided by the groove 41 of the guide frame 40 to be respectively connected to the air inlet tunnel 13 and the water inlet tunnel 14 in the cavity 11 through the guiding tunnel 42.

The riser 30 is located on the side of the mount 20 near the end face of the tunnel 12 of the cleaning member 10 and is connected with the step tunnel 16 of the cleaning member 10 through the rotary axis 31. By rotating the cleaning member 10 along the axis of the step tunnel 16, the direction of the cleaning member 10 is adjusted. In this way, the end face of the tunnel 12 may be adjusted to be corresponding to the housing surface of the monitor 200 such that the end face of the tunnel 12 is set parallel to the housing surface of the monitor 200. Accordingly, the fluid in the tunnel 12 can be directly sprayed towards the housing surface of the monitor 200, so as to improve the cleaning effect and avoid the waste of cleaning fluid. The wide outer end face of the riser 30 is convex on the end face of the cleaning member 10 near the side of the tunnel 12. That is, the riser 30 has a wider side, which is closer to the monitor in contrast to the cleaning member 10. In the cleaning process, the housing surface of the monitor 200 is also surrounded by the width of the riser 30.

The riser 30 is a solid plate structure, where its lower end surface is compatible with the side wall surface of the cleaning member 10, and its height is higher than the height of the cleaning member 10, and slightly higher than the height of the mount. A number of small round tunnels are provided on the back of the riser 30 for adjusting the position of the cleaning member 10 and the fixing block 20 that are matched with it. The riser 30 is not only connected and fixed with the mount 20 and the cleaning member 10, which could improve the overall strength of the cleaning device 100. It can also be used as a fixing plate to adjust the rotation direction of the cleaning member 10. At the same time, it also prevents cleaning fluid and silica wastes on the housing surface of the cleaning monitor 200 from being splashed to other locations.

The guide frame 40 is mainly used to guide the gas tube and the liquid tube to be connected to the air inlet tunnel 13 and the water inlet tunnel 14 in the cleaning member 10. The guide frame 40 is suspended on the mount 20 and is located at one end of the air intake tunnel 13 on the cleaning member 10 near the cavity 11. That is, the guide frame 40 is placed on top of the cleaning member 10 and connected to the mount 20. The mount 20 is provided with a guiding tunnel 42. The guiding tunnel 42 is close to a side of the cavity 11. The guiding tunnel 42 can further improve the fine-tuning effect of the position of the gas tube and the liquid tube, so that they are coordinated with the air inlet tunnel 13 and the water inlet tunnel 14. An open structure of the conductor duct 41 is provided along its height direction, and two spaced bosses are provided on the side of the conductor duct 41 near the cleaning member 10, and there are also spacers between the bosses. The upper and lower bosses are set to adjust the positions of the gas tube and the liquid tube during the slicing process. In another embodiment, the structure of the wire duct 41 can also be designed as other types of structures, including the structure without the upper and lower bosses, as long as the gas tube and the liquid tube could be guided by the wire duct 41 and the guiding tunnel 42 to be connected to the air inlet tunnel 13 and the water inlet tunnel 14 on the cavity 11. At the same time, this structure can further reduce the weight of the guide frame 40 and thus further improve the stability of fixing the guide frame 40.

On the side of the riser 30 near the cleaning member 10, an L-shaped structure of the protective plate 50 is provided The protective plate 50 is directly fixed on the riser 30, and its horizontal folding plate is provided along the width direction of the riser 30. The horizontal folding plate is located above the baffle 17 in the cleaning member 10 and completely covers the thickness of the baffle 17. That is, the horizontal width of the protective plate 50 along the width direction of the riser plate 30 is greater than its horizontal width to the baffle 17. The vertical folding plate of the protective plate 50 is disposed in the height direction of the riser 30 and is located below the top of the baffle 17. The protective plate 50 and the baffle completely forms a curved airflow channel. The purpose is to block the gas-liquid mixed fluid and the cleaned silica wastes from being reflected from the surface of the housing surface of the monitor 200 during the cleaning process. The fluid or the silica wastes will be splashed directly to the baffle 17 and then dropped into the deflector plate 60 to avoid secondary contamination to the housing surface of the monitor 200.

On the lower end face of the riser 30 and close to one side of the end of the tunnel 11 in the cleaning member 10, a deflector plate 60 is provided. The deflector plate 60 and the riser 30 are connected but could be detached. The deflector plate 60 has a semi-open structure including a bottom surface and adjacent two sides. The deflector plate 60 is mainly used to undertake the silica wastes and the cleaning fluid to prevent silica wastes from being transferred into the net.

The cleaning device 100 is located directly opposite the emitter of the monitor 200 in the cleaning process, such that the housing surface corresponding to the emitter of the monitor 200 could be cleaned when the monitor 200 remains still.

Before the cleaning process, the cleaning element 10 is controlled to rotate along the axis of the step tunnel 16, so that the end face of the tunnel 12 and the housing face corresponding to the emitter of the monitor 200 are set in parallel.

Then, the cleaning member 10 is controlled to approach the housing surface corresponding to the emitter 200 of the monitor with a certain gap. The fluid flowing from a plurality of tunnels 12 is sprayed in an inclined line towards the housing surface corresponding to the emitter of the monitor 200.

In this embodiment, the fluid is a mixture of gas and water. In the cleaning process, the gas flow in the fluid is controlled to be less than the water flow. After the cleaning process, the gas flow in the fluid is controlled to be greater than the water flow to dry the housing surface corresponding to the emitter of the monitor 200.

According to another embodiment, a slicer is disclosed. The slicer includes the above-mentioned cleaning device 100.

According to an embodiment of the present disclosure, a slicer is disclosed. The slicer includes the above-mentioned cleaning device.

In sum, the present disclosure discloses a cleaning device and a related slicer. The cleaning device having a gas-liquid mixing and adjustable flow can directly aim at the net monitor to clean, which not only have a fast cleaning speed but also a good cleaning effect. It is possible to clean the silica waste or the water mist on the housing surface corresponding to the monitor emitter in a very short time.

2. The tunnels are distributed in a radial pattern from one end of the cavity to the outer end surface of the cleaning piece, which makes it easier to obtain a fluid solution with different injection flow rates at multiple angles to clean the silica waste or water mist on the housing surface of the monitor. This could quickly and accurately clean the silica waste or water mist in the housing surface corresponding to the monitor emitter in a very short time and improve the cleaning efficiency and cleaning quality.
3. By controlling the rotation of the cleaning member using the axis of the rotation axis as a center, the rotation direction of the cleaning member can be adjusted, so that the position of the end face of the tunnels relative to the housing surface of the monitor can be adjusted. This allows the end face of the tunnels to be set parallel to the housing surface of the monitor, so that the fluid in the tunnels can be directly sprayed toward to the housing surface of the monitor to improve cleaning effectiveness and avoid waste of cleaning fluid.
4. The axis of the water injecting tunnel that intersects with the axis of the cavity is inclined in the direction close to the side of the tunnel, in order to increase the pressure of the water, so that it could quickly move forward in the direction of the flow rate in the cavity, and can be mixed and moved by the air flow in the direction of the tunnel at the same time. The structure of inclined setting can also further reduce the occupied area and the installation space of the through-tunnel, avoid its interference with other devices, and improve the space utilization rate in the cutting chamber.
5. There is a groove between the outer end surface of the tunnels and the outer wall of the cleaning member as the circulation channel of the washed silica waste, and the water mist or cleaning liquids reflected to the end of the cleaning member flows down through the open groove into the deflector plate to avoid secondary pollution to the housing surface of the monitor.
6. The present disclosure also provides a cleaning method for sampling the cleaning device. The cleaning quality is controllable and safe, the cleaning effect is good and the speed is fast.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A cleaning device for a net monitor, comprising:

a cleaning member constructed with a cavity, wherein a plurality of tunnels connected to the cavity and defined divergently from one end of the cavity to one side of an outer end face of the cleaning member; and angles between axes of the tunnels and an axis of the cavity are different from each other.

2. The cleaning device of claim 1, wherein one angle between an axis of one of the tunnels and the axis of the cavity is at an acute angle less than 30°.

3. The cleaning device of claim 1, wherein the cavity is further connected with two through pipes respectively so that fluids in the two through pipes are mixed in the cavity.

4. The cleaning device of claim 1, wherein the cavity is constructed as a ring columnar structure and an outer end face of the cavity adjacent to one side of the tunnels is an arc surface structure.

5. The cleaning device of claim 1, wherein in the outer end face of the cleaning member adjacent to one side of the tunnels, a circumferential edge of the outer end face, along where an orifice is located, is constructed with a groove, and the structure of the groove matches the structure of the outer end face of the cleaning member;

wherein an end face of the groove located below the tunnels is constructed as an open structure; and wherein outer ends of the tunnels are located on a flat surface that is disposed flush with the outer end face of the cleaning member.

6. The cleaning device of claim 5, wherein the cleaning member is provided with a baffle at a top of an end face adjacent to one side of the tunnels.

7. The cleaning device of claim 1, further comprising:

a rotating axis placed in a thickness direction of the cleaning member, configured to fix the cleaning member to a mount;

wherein orientations of the tunnels are adjusted by rotating the cleaning member using the rotating axis as a center.

8. The cleaning device of claim 7, wherein the cleaning device further comprises:

a guide frame, placed on top of the cleaning member and connected to the mount; wherein the mount comprises a guiding tunnel, placed adjacent to one side of the cavity.

9. The cleaning device of claim 7, further comprising:

a guide frame, placed on top of the cleaning member and connected to the mount; wherein the mount comprises a guiding tunnel, placed adjacent to one side of the cavity.

10. The cleaning device of claim 7, further comprising:

a riser, wherein the mount and the riser are disposed on a same side of the cleaning member; the mount, the riser and the cleaning member are connected to each other; and a wide outer end face of the riser is convex at an end face of the cleaning member adjacent to the tunnels.

11. The cleaning device of claim 10, further comprising:

a deflector plate, placed on a side adjacent to the tunnels, connected to the riser.

12. The cleaning device of claim 10, wherein the cleaning device further comprises:

a deflector plate, placed on a side adjacent to the tunnels, connected to the riser.

13. A slicer, comprising a cleaning device, the cleaning device comprising a cleaning member constructed with a cavity, wherein a plurality of tunnels connected to the cavity and defined divergently from one end of the cavity to one side of an outer end face of the cleaning member; and angles between axes of the tunnels and an axis of the cavity are different from each other.

14. The slicer of claim 13, wherein one angle between an axis of one of the tunnels and the axis of the cavity is at an acute angle not more than 30°.

15. The slicer of claim 13, wherein the cavity is further connected with two through pipes respectively so that fluids in the two through pipes are mixed in the cavity.

16. The slicer of claim 13, wherein the cavity is constructed as a ring columnar structure and an outer end face of the cavity adjacent to one side of the tunnels is an arc surface structure.

17. The slicer of claim 13, wherein in the outer end face of the cleaning member adjacent to one side of the tunnels, a circumferential edge of the outer end face, along where an orifice is located, is constructed with a groove, and the structure of the groove matches the structure of the outer end face of the cleaning member;

wherein an end face of the groove located below the tunnels is constructed as an open structure; and wherein outer ends of the tunnels are located on a flat surface that is disposed flush with the outer end face of the cleaning member.

18. The slicer of claim 17, wherein the cleaning member is provided with a baffle at a top of an end face adjacent to one side of the tunnels.

19. The slicer of claim 13, wherein the cleaning device further comprises:

a rotating axis placed in a thickness direction of the cleaning member, configured to fix the cleaning member to a mount;

wherein orientations of the tunnels are adjusted by rotating the cleaning member using the rotating axis as a center.

20. The slicer of claim 19, wherein the cleaning device further comprises:

a riser, wherein the mount and the riser are disposed on a same side of the cleaning member; the mount, the riser and the cleaning member are connected to each other; and a wide outer end face of the riser is convex at an end face of the cleaning member adjacent to the tunnels.

* * * * *